March 26, 1957 H. G. LIEBERMAN 2,786,947
DENTAL X-RAY FILM HOLDER
Filed March 21, 1956

INVENTOR.
Heiman G. Lieberman.
BY Max R. Kraus
Atty.

United States Patent Office 2,786,947
Patented Mar. 26, 1957

2,786,947

DENTAL X-RAY FILM HOLDER

Heiman G. Lieberman, Evansville, Ind.

Application March 21, 1956, Serial No. 573,007

5 Claims. (Cl. 250—70)

This invention relates to a dental X-ray film holder. One of the objects of this invention is to provide a holder for supporting dental X-ray film in the mouth, which has a highly flexible portion between the bite or teeth engaging member and the film retaining portion, which flexes sufficiently to permit the film retaining portion to be positioned at the desired angle so as to accommodate the film in the mouth without bending or flexing of the film.

The prior art patents show various types of dental X-ray film holders but some are objectionable in that when the film contacts the palate or any portion of the mouth, the film bends or flexes, consequently the resultant picture is distorted which is highly objectionable. This invention obviates the foregoing objectionable features in that there is provided a holder which spaces the film retaining portion from the teeth engaging portion and provides a flexible portion which permits the film retaining portion to position itself at the desired angular position in the mouth so that film will remain perfectly flat in the mouth so that the resultant picture will not be distorted.

Another object of this invention is to provide a holder of the character described which has a film retaining member provided with inclined surfaces to permit engagement by the teeth particularly the anterior teeth of the mouth.

Another object of this invention is to provide a one-piece holder which is simple and inexpensive to manufacture, which retains the film in the mouth at the desired angle in a flat condition and which accommodates the film in the mouth without inconvenience or discomfort to the patient.

Other objects will become apparent as this description progresses.

Figure 1:
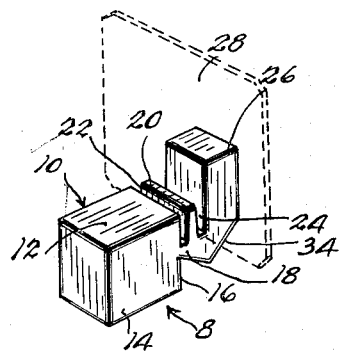
Fig. 1 is a perspective view of my dental X-ray film holder supporting a film.
Figure 2:
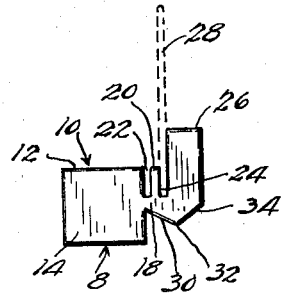
Fig. 2 is a side elevational view.

The holder generally designated by the numeral 8 is made of one piece and is formed of a resilient and flexible material such as rubber or the like. It comprises a rectangular shaped block or base 10 having flat parallel horizontal surfaces 12 and 14. Extending from the rear end wall 16 is a comparatively thin neck portion 18 which has a vertical wall 20 parallel with the end wall 16 and defining a slot 22. The neck extends rearwardly of wall 20 and is provided with a second slot 24 which has a backing support 26 extending upwardly of the top plane of the horizontal surface 12. The vertical wall 20, slot 24 and backing support 26 are the film retaining portion of the holder. The X-ray film packet 28 is inserted in the slot 24 and is frictionally held therein and supported against the backing support 26. The bottom of slot 24 is slightly above the center of the height of the block or base 10.

The bottom wall 30 of the neck portion 18 slopes or tapers downwardly and outwardly from the rear end wall 16 of the block 10 to an edge 32 in the bottom of the backing support 26. The bottom of the backing support then slopes or tapers upwardly as at 34 to the end wall of the backing member. The tapered surface 30 of the neck 18 provides a progressively thickened neck wall thereby providing for the greatest flexibility of the neck between the rear wall 16 of the base and the front of the vertical wall 20 or in the area of the slot 22.

Figure 3:
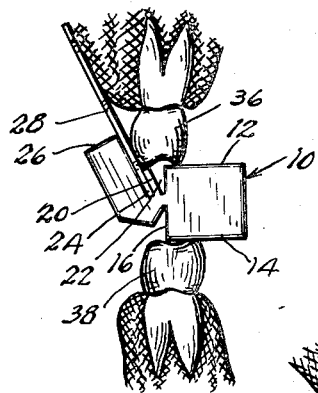
Fig. 3 is a side elevational view showing the holder in use for an upper posterior tooth.

The great flexibility of this portion permits bending of the neck to position the film retaining portion and film therein in any desired angular relation with respect to the block or base 10. There is thus provided a flexible neck between the block and the film retaining portion which spaces the film retaining portion with respect to the block. As shown in Fig. 3, the X-ray holder is positioned to X-ray an upper posterior tooth 36. The block 10 is engaged by upper and lower teeth 36 and 38 spacing the teeth from each other as shown. The upper tooth 36 in addition to engaging the uper surface 14 of the block also engages the vertical wall 20 adjacent the X-ray film 28. The neck 18 flexes sufficiently to position the film retaining portion at the desired angle so that the film itself is held flat and is not bent. It is positioned to take an X-ray of the complete tooth. Furthermore, if the film should engage the palate of the mouth the film will not bend but the neck will permit further flexing of the neck without causing any flexing of the film.

Figure 4:
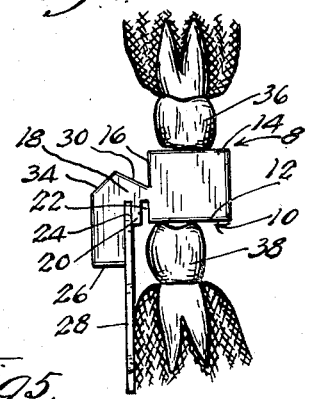
Fig. 4 is a view similar to Fig. 3 but for a lower posterior tooth.

Fig. 4 shows the holder reversed from that of Fig. 3 for the purpose of X-raying the lower posterior tooth 38. The anatomy of the mouth allows the film to lie substantially parallel with the longitudinal axis of the tooth 38.

Figure 5:
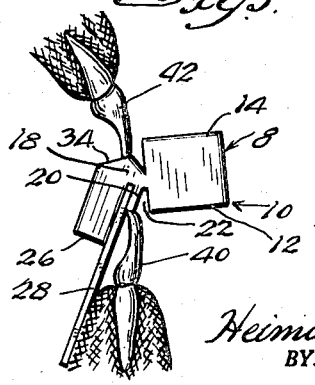
Fig. 5 is a view similar to Fig. 4 but showing it in position for X-raying a lower anterior tooth.

Fig. 5 shows the holder in position for X-raying a lower anterior tooth 40. In this connection the upper anterior tooth 42 will engage the inclined wall 34 of the backing support of the film retaining portion and the lower tooth 40 will engage the top of the vertical 20. To X-ray the upper anterior tooth 42, the holder is reversed from that shown in Fig. 5.

In all instances the film is positioned so that it projects beyond the root tips to X-ray the complete tooth.

It will be understood that various changes and modifications may be made from the foregoing without departing from the spirit and scope of the appended claims.

I claim:

1. An X-ray dental film holder comprising a base, a thin flexible neck, and a slotted film retaining member positioned rearwardly of said neck and having a backing wall extending upwardly of the top plane of said base, said neck extending rearwardly of the base and between the top and bottom planes of said base and flexing to position the film in the mouth without distorting the film.

2. An X-ray dental film holder comprising a base, a slotted film retaining member having a backing wall extending upwardly of the top plane of said base, a highly flexible neck between said base and said film retaining member and spacing said film retaining member from said base, said neck permitting angular positioning of said film retaining member in the mouth without distorting the film.

3. An X-ray dental film holder made of one piece of flexible material comprising a rectangular shaped block member, a flexible neck extending rearwardly of said block between the top and bottom of said block, a film retaining member extending laterally of said neck and comprising a slot and a raised backing member extending upwardly of the top of said block, the bottom of said slot being positioned between the top and bottom planes of said block.

4. An X-ray dental film holder made of one piece of material comprising a block member, a flexible neck extending rearwardly of said block between the top and bottom of said block, a vertical wall adjacent the outer end of said neck and spaced from said block, a backing member spaced from said vertical wall to provide a film retaining slot therebetween, the bottom of said slot being disposed approximately midway between the top and bottom planes of said block member.

5. An X-ray dental film holder comprising a block member, a thin flexible neck and a slotted film retaining member having a backing wall extending upwardly of the top plane of said block, said neck extending rearwardly of the block member and between the top and bottom planes of said block member, the bottom wall of said neck sloping downwardly and outwardly from said block member and the bottom wall of said film retaining member sloping downwardly and inwardly to a juncture with said neck sloping wall.

References Cited in the file of this patent

UNITED STATES PATENTS

| | | |
|---|---|---|
| 2,021,190 | Malkasian | Nov. 19, 1935 |
| 2,614,225 | Shapiro | Oct. 14, 1952 |